US012763237B2

(12) United States Patent
Kawamura

(10) Patent No.: US 12,763,237 B2
(45) Date of Patent: Oct. 13, 2026

(54) GRAIN-ORIENTED ELECTRICAL STEEL SHEET AND MANUFACTURING METHOD THEREFOR

(71) Applicant: NIPPON STEEL CORPORATION, Tokyo (JP)

(72) Inventor: Yusuke Kawamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 51 days.

(21) Appl. No.: 18/729,419

(22) PCT Filed: Mar. 27, 2023

(86) PCT No.: PCT/JP2023/012183
§ 371 (c)(1),
(2) Date: Jul. 16, 2024

(87) PCT Pub. No.: WO2023/190331
PCT Pub. Date: Oct. 5, 2023

(65) Prior Publication Data
US 2025/0118469 A1 Apr. 10, 2025

(30) Foreign Application Priority Data
Mar. 28, 2022 (JP) ................................ 2022-052345

(51) Int. Cl.
*H01F 1/147* (2006.01)

(52) U.S. Cl.
CPC ................................ *H01F 1/14791* (2013.01)

(58) Field of Classification Search
None
See application file for complete search history.

(56) References Cited

U.S. PATENT DOCUMENTS 10,610,964 B2 * 4/2020 Arai ........................ C21D 9/46
12,031,191 B2 * 7/2024 Arai .................... C21D 8/1266
2010/0279141 A1 11/2010 Iwata et al.
2013/0160901 A1 6/2013 Omura et al.
2015/0111004 A1 4/2015 Senda et al.
(Continued)

FOREIGN PATENT DOCUMENTS

JP 11-293340 A 10/1999
JP H11293340 A * 10/1999
JP 3148092 B2 3/2001
(Continued)

*Primary Examiner* — Daniel J. Schleis
(74) *Attorney, Agent, or Firm* — Birch, Stewart, Kolasch & Birch, LLP

(57) ABSTRACT

On a surface of the grain-oriented electrical steel sheet, a rate (a groove existence rate) of a part (a groove formation line) where a groove having a depth of 5 μm to 50 μm and a width of 10 μm to 300 μm exists among a total extension of magnetic domain control treatment lines which forms an angle of 0° to 45° with respect to an orthogonal-to-rolling direction and are arranged in a rolling direction is 50% or more in a first region which is a region where a β angle which is a deviation angle of a grain from a Goss orientation around an axis in the orthogonal-to-rolling direction is 1° or less, and the groove existence rate is less than 50% in a second region where the β angle is more than 2°.

8 Claims, 10 Drawing Sheets

(56) References Cited

U.S. PATENT DOCUMENTS

2017/0298467 A1 10/2017 Suehiro et al.

FOREIGN PATENT DOCUMENTS

| | | | | |
|---|---|---|---|---|
| JP | 2012-12664 | A | | 1/2012 |
| JP | 2012-57219 | A | | 3/2012 |
| JP | 2012-77380 | A | | 4/2012 |
| JP | 2012-126973 | A | | 7/2012 |
| JP | 2015-206114 | A | | 11/2015 |
| JP | 2020169373 | A | * | 10/2020 |
| KR | 10-2010-0102725 | A | | 9/2010 |
| WO | WO 2013/160955 | A1 | | 10/2013 |
| WO | WO 2016/056501 | A1 | | 4/2016 |

* cited by examiner

GRAIN-ORIENTED ELECTRICAL STEEL SHEET AND MANUFACTURING METHOD THEREFOR

TECHNICAL FIELD OF THE INVENTION

The present disclosure relates to a grain-oriented electrical steel sheet and a manufacturing method therefore.

The present application claims priority based on Japanese Patent Application No. 2022 052345 filed in Japan on Mar. 28, 2022, the contents of which are incorporated herein by reference.

RELATED ART

A grain-oriented electrical steel sheet is a steel sheet containing 7% by mass or less of Si and having a secondary recrystallization texture in which secondary recrystallized grains are accumulated in the {110}<001> orientation (Goss orientation). The grain-oriented electrical steel sheet is mainly used as a core of an electric power transformer, and there is an increasing need for reduction of noise in addition to reduction of energy loss (iron loss).

For reduction in iron loss, there has been known a magnetic domain refinement technique for reducing the magnetic domain width by irradiating a surface of a grain-oriented electrical steel sheet with a laser or an electron beam in a direction intersecting a rolling direction. In recent years, in order to provide a grain-oriented electrical steel sheet having good iron loss characteristics, various improved techniques related to magnetic domain refinement have been proposed (see, for example, Patent Documents 1 to 5).

CITATION LIST

Patent Document

Patent Document 1: Japanese Unexamined Patent Application, First Publication No. 2012-57219

Patent Document 2: Japanese Unexamined Patent Application, First Publication No. 2012-12664

Patent Document 3: Japanese Unexamined Patent Application, First Publication No. 2012-77380

Patent Document 4: Japanese Unexamined Patent Application, First Publication No. 2012-126973

Patent Document 5: Japanese Patent Publication No. 3148092

Patent Document 6: International Publication No. 2016/056501

Patent Document 7: International Publication No. 2013/160955

Patent Document 8: Japanese Unexamined Patent Application, First Publication No. 2015-206114

Patent Document 9: Japanese Unexamined Patent Application, First Publication No. 2012-57219

SUMMARY OF INVENTION

Problems to be Solved by the Invention

However, when a grain-oriented electrical steel sheet is subjected to the magnetic domain refinement treatment, there arises a problem that the magnetostriction characteristic changes due to the reflux magnetic domain and the noise of the transformer increases. As described above, since there is a trade-off relationship between the reduction in iron loss and the reduction in noise of the grain-oriented electrical steel sheet, there is a demand for an optimal magnetic domain refinement technique that can achieve both of them. None of Patent Documents 1 to 9 discloses a magnetic domain refinement treatment method capable of reducing iron loss without increasing noise. The present inventors considered that it is effective to perform the magnetic domain refinement treatment only on a specific point since the magnetic domain width and the B angle are not uniform in the grain-oriented electrical steel sheet before the magnetic domain refinement treatment. However, such a magnetic domain refinement treatment method is not disclosed in any patent document.

An object of the present disclosure is to provide a grain-oriented electrical steel sheet capable of achieving both iron loss reduction and noise reduction, and a manufacturing method therefore.

Means for Solving the Problem (1) In the grain-oriented electrical steel sheet according to an embodiment of the present invention, on a surface of the grain-oriented electrical steel sheet, a groove existence rate which is a rate of a part where a groove having a depth of 5 μm to 50 μm and a width of 10 μm to 300 μm exists among a total extension of magnetic domain control treatment lines which forms an angle of 0° to 45° with respect to an orthogonal-to-rolling direction and are arranged in a rolling direction is 50% or more in a first region which is a region where a β angle which is a deviation angle of a grain from a Goss orientation around an axis in the orthogonal-to-rolling direction is 1° or less, and the groove existence rate is less than 50% in a second region where the β angle is more than 2°.

(2) Preferably, in the grain-oriented electrical steel sheet according to (1), the groove existence rate is 20% or more and 80% or less in a third region which is a region where the β angle is more than 1° and 2° or less, and the groove existence rate in the first region≥the groove existence rate in the third region≥the groove existence rate in the second region.

(3) Preferably, in the grain-oriented electrical steel sheet according to (1) or (2), the groove having the depth of 5 μm to 50 μm and the width of 10 μm to 300 μm exists at an interval of 1 mm to 20 mm in the rolling direction.

(4) A method for manufacturing a grain-oriented electrical steel sheet according to another embodiment of the present invention includes: acquiring a magnetic domain image of a grain-oriented electrical steel sheet; determining, based on a spatial distribution of a magnetic domain width of the magnetic domain image and a β angle which is a deviation angle of a grain from a Goss orientation around an axis in the orthogonal-to-rolling direction, a point in which a groove having a depth of 5 μm to 50 μm and a width of 10 μm to 300 μm is formed among magnetic domain control treatment lines which forms an angle of 0° to 45° with respect to an orthogonal-to-rolling direction of the grain-oriented electrical steel sheet and are arranged in a rolling direction; and forming the groove to the point determined during the determining among the magnetic domain control treatment line.

(5) Preferably, in the method for manufacturing a grain-oriented electrical steel sheet according to (4), in the determining, a point having the β angle of 1° or less in the magnetic domain control treatment line is determined as a point in which the groove is formed.

(6) Preferably, in the method for manufacturing a grain-oriented electrical steel sheet according to (4) or (5), in the determining, a spatial distribution of the magnetic domain width is derived from the magnetic domain image by using two-dimensional Fourier transform.

Effects of the Invention

According to the grain-oriented electrical steel sheet according to the embodiment of the present invention, it is possible to achieve both iron loss reduction and noise reduction.

According to the method for manufacturing a grain-oriented electrical steel sheet according to the embodiment of the present invention, it is possible to provide a grain-oriented electrical steel sheet that achieves both a reduction in iron loss and a reduction in noise.

EMBODIMENTS OF THE INVENTION

Hereinafter, embodiments of the present invention are described with reference to the drawings.

Figure 1A:
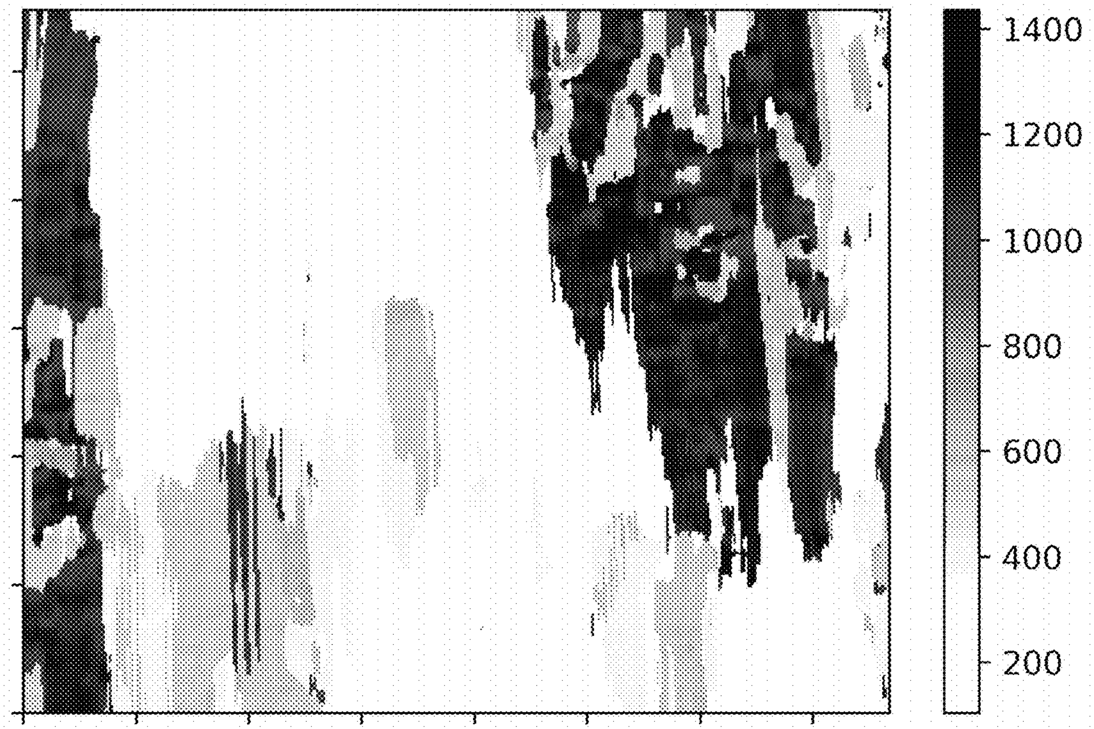
FIG. 1A is a graph showing an example of a spatial distribution of a magnetic domain width of a grain-oriented electrical steel sheet before a magnetic domain refinement treatment.
Figure 1B:
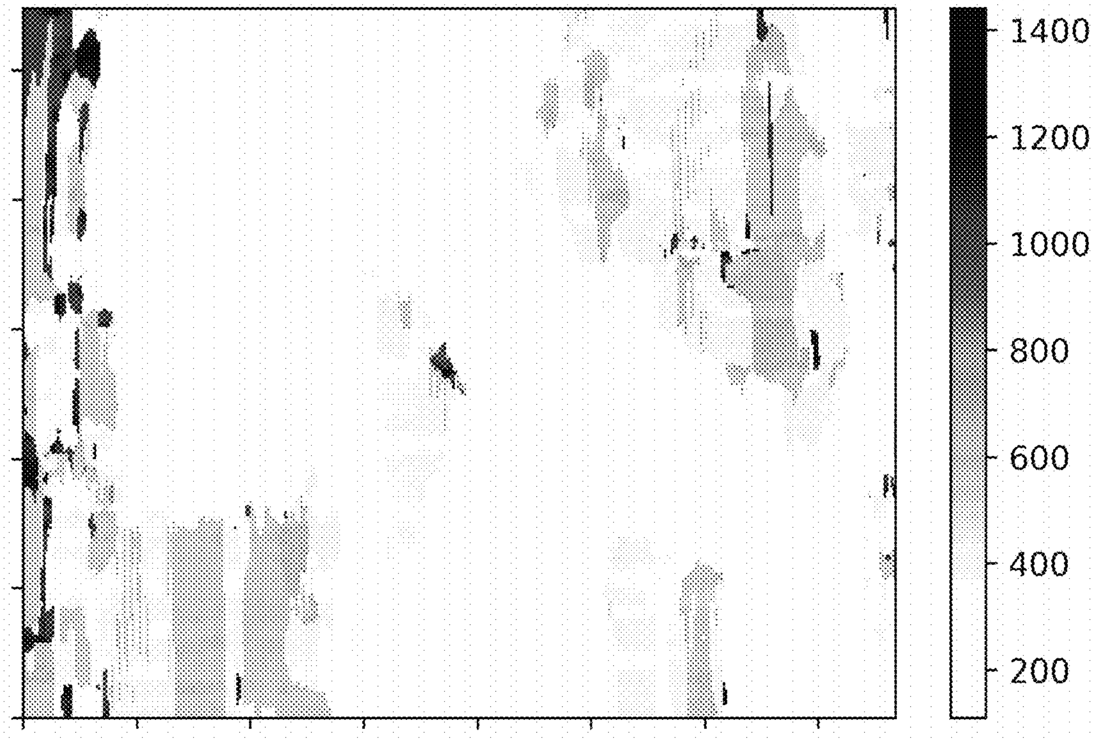
FIG. 1B is a graph showing an example of a spatial distribution of the magnetic domain width of the grain-oriented electrical steel sheet after a magnetic domain refinement treatment.

First, the magnetic domain structures of the grain-oriented electrical steel sheets before and after the magnetic domain refinement treatment are compared. FIG. 1A illustrates a spatial distribution of a width of a 180° magnetic domain of a grain-oriented electrical steel sheet (Hereinafter, it is simply referred to as a "magnetic domain width".) before a magnetic domain refinement treatment. FIG. 1B illustrates the spatial distribution of the magnetic domain width after the magnetic domain refinement treatment is performed on the surface of the grain-oriented electrical steel sheet in FIG. 1A. The magnetic domain refinement treatment here is performed by forming a groove along a magnetic domain control treatment line which forms an angle of 0° to 45° with respect to the rolling direction (RD).

The "180° magnetic domain" refers to a magnetic domain in which the magnetization direction is the <100> orientation of the crystal and which is sandwiched between two 180° magnetic walls substantially parallel to the rolling direction. The "width" of the 180° magnetic domain refers to a distance between adjacent magnetic walls (magnetic wall interval).

The spatial distribution of the magnetic domain width shown in FIGS. 1A and 1B is derived from the magnetic domain image of the grain-oriented electrical steel sheet using a two-dimensional Fourier transform described later.

Figure 1C:
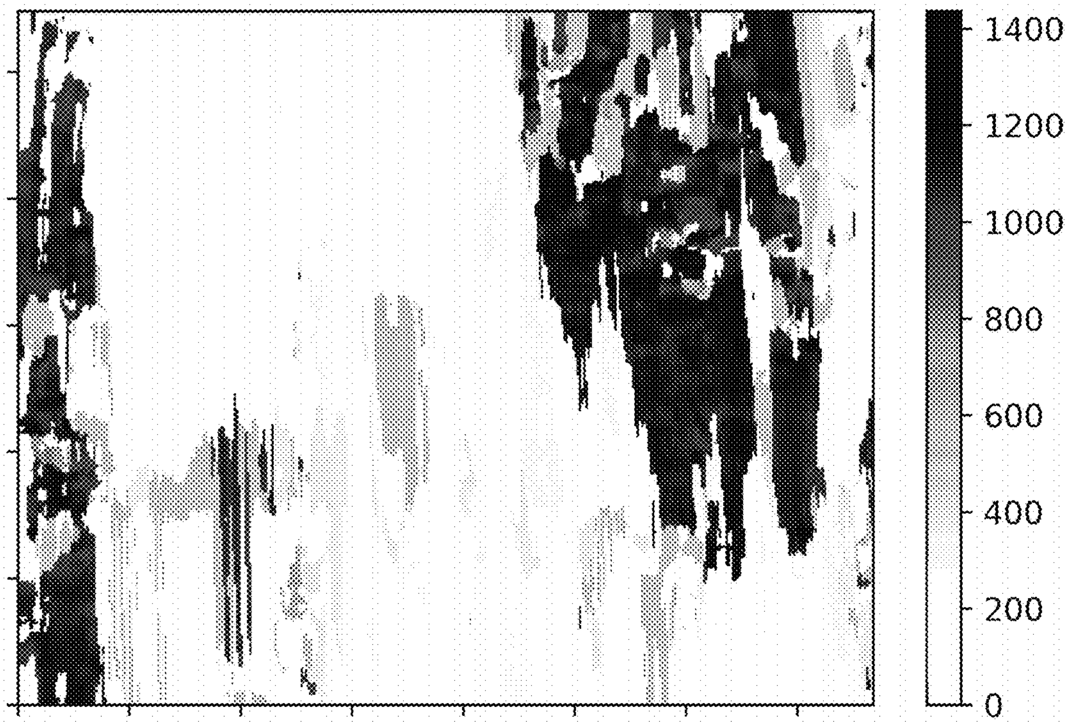
FIG. 1C is a graph showing regions where the magnetic domain width is refined by 50 μm or more before and after the magnetic domain refinement shown in FIGS. 1A and 1B.

FIG. 1C illustrates regions where the magnetic domain width is refined by 50 μm or more before and after the magnetic domain refinement shown in FIGS. 1A and 1B, and visualizes a value of an original magnetic domain width at which refinement occurs.

From FIG. 1C, it can be seen that the region where the effect of the magnetic domain refinement was 50 μm or more is a region where the original magnetic domain width is wide, and in particular, the effect of the magnetic domain refinement remarkably appears in a region where the original magnetic domain width is about 500 μm or more. That is, the effect of magnetic domain refinement varies depending on the original magnetic domain width.

Figure 2A:
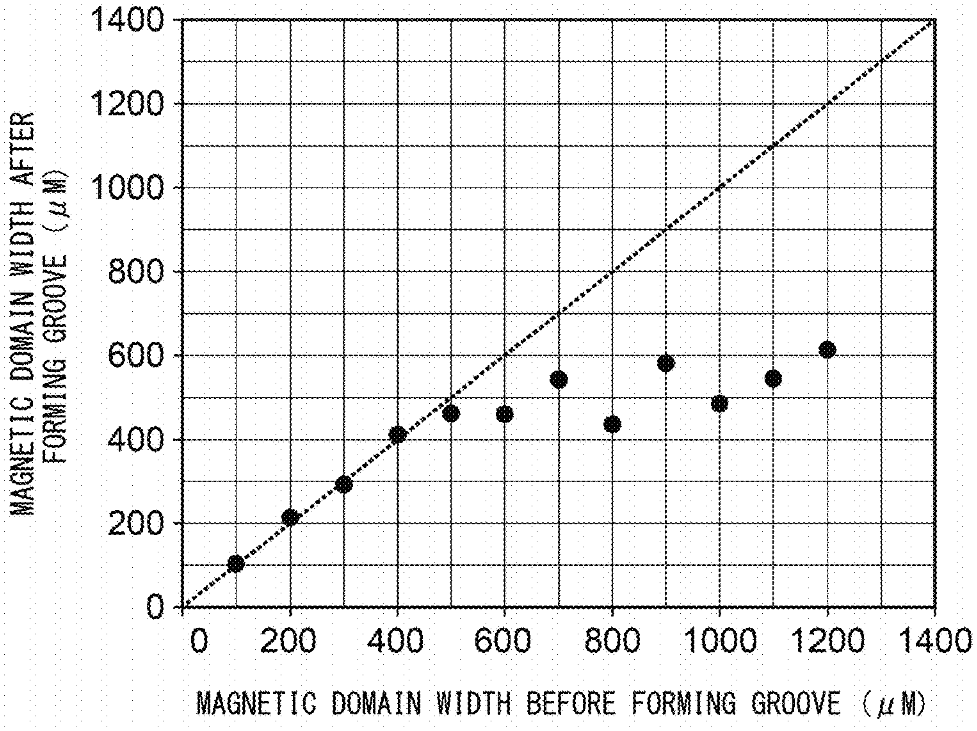
FIG. 2A is a graph showing a relationship between the magnetic domain width before groove formation and the magnetic domain width after groove formation.

FIG. 2A shows a relationship between the magnetic domain width before groove formation and the magnetic domain width after groove formation at the same position. As the conditions for forming the groove, the depth of the groove is 20 μm, the width of the groove is 100 μm, and the pitch between the grooves is 4 mm.

As can be seen from FIG. 2A, even if the groove is formed to a region having the magnetic domain width of about 500 μm or less, the effect of magnetic domain refinement does not appear.

From the above, it is considered that the effect of reducing the iron loss is obtained by magnetic domain refinement of a region having a large original magnetic domain width, and even if the magnetic domain refinement is performed on a region having a small original magnetic domain width, the effect of reducing the iron loss cannot be obtained, leading to an increase in hysteresis loss, deterioration of noise characteristics, and decrease in magnetic permeability.

Figure 2B:
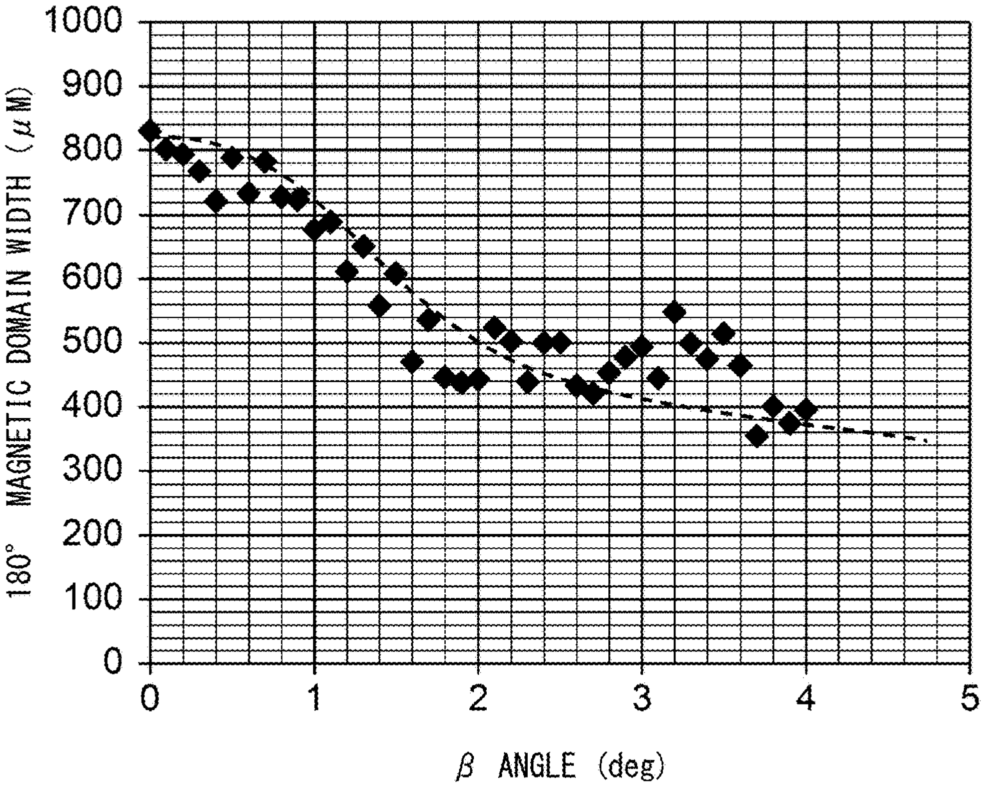
FIG. 2B is a graph showing the relationship between the β angle of the grain-oriented electrical steel sheet and the widths of the 180° magnetic domains.
Figure 9:
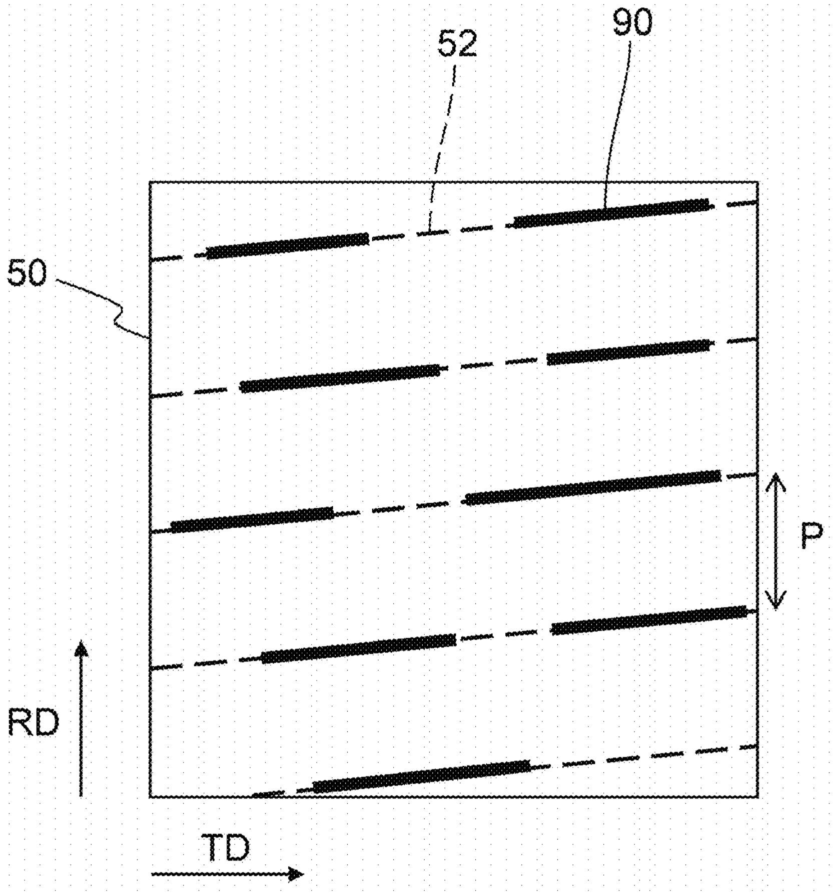
FIG. 9 is a schematic view illustrating a groove formation line among magnetic domain control treatment lines of a grain-oriented electrical steel sheet.

In order to reduce the iron loss of the grain-oriented electrical steel sheet, it is required to highly align the secondary recrystallized grains in the steel sheet to the <001> orientation (Goss orientation). However, when a grain-oriented electrical steel sheet is industrially manufactured, a grain in an orientation deviated from the ideal Goss orientation also occurs in the process of secondary recrystallization. The deviation angle of the grains from the Goss orientation about the axis in the orthogonal-to-rolling direction (TD) is referred to as a β angle. As shown in FIG. 9, the orthogonal-to-rolling direction (TD) is a direction perpendicular to the rolling direction (RD) and parallel to the sheet surface of the grain-oriented electrical steel sheet. FIG. 2B illustrates the relationship between the β angle of the grain-oriented electrical steel sheet and the 180° magnetic domain width before laser irradiation. As can be seen from FIG. 2B, since the region having the β angle of 2° or less has a wide original magnetic domain width (about 500 μm or more), it is effective to preferentially perform the magnetic domain refinement treatment on the region having the β angle of 2° or less, more preferably on the region having the β angle of 1° or less.

In addition, there is known a technique of reducing iron loss by forming grooves, which are in a range of 0° to 45° with respect to the orthogonal-to-rolling direction (TD), which have a predetermined depth and a predetermined width and which are in a predetermined interval along to the rolling direction (RD), on the surface of the grain-oriented electrical steel sheet (see Patent Document 5).

Therefore, in the present embodiment, on the surface of the grain-oriented electrical steel sheet, magnetic domain control is performed so as to preferentially form a groove having a predetermined depth and a predetermined width in a region where the β angle is 1° or less.

Next, the constitution of a device that realizes magnetic domain control of the grain-oriented electrical steel sheet according to the present embodiment is described with reference to FIGS. 3 to 5.

Figure 3:
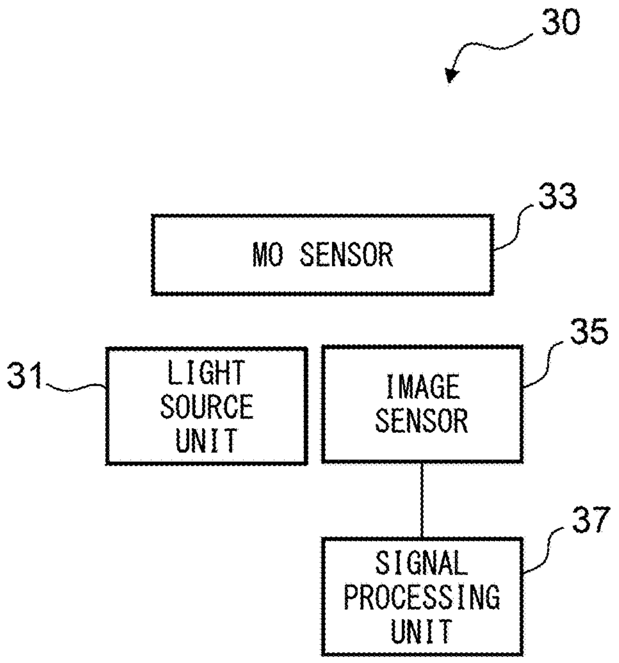
FIG. 3 is a block diagram illustrating the hardware constitution of the image acquisition device according to the present embodiment.

FIG. 3 illustrates the hardware constitution of the image acquisition device 30 that acquires a magnetic domain image of a grain-oriented electrical steel sheet. The image acquisition device 30 includes a light source unit 31, a magneto-optical (MO) sensor 33, an image sensor 35, and a signal processing unit 37.

The light source unit 31 includes a light source including a light emitting diode (LED), and irradiates the MO sensor 33 with light having a uniform polarization plane.

The MO sensor 33 is a device that measures a structure of a magnetic body, and has an observed section on which a magnetic sample to be measured is placed. The light emitted from the light source unit 31 passes through the inside of the MO sensor 33 and is reflected by the reflection layer, and the reflected light passes through the inside of the MO sensor 33 again and is output to the outside of the MO sensor 33. When the grain-oriented electrical steel sheet is placed as the magnetic body sample on the observed section of the MO sensor 33, a leakage magnetic field corresponding to the direction of spontaneous magnetization of the grain-oriented electrical steel sheet is generated inside the MO sensor 33, and the polarization plane of the reflected light is rotated by the leakage magnetic field.

The image sensor 35 is a Complementary Metal-Oxide-Semiconductor (CMOS) image sensor, forms an image of reflected light from the MO sensor 33 on a light receiving surface, performs photoelectric conversion, and an analog signal after photoelectric conversion is output to the signal processing unit 37. The spatial distribution of the leakage magnetic field can be obtained by detecting the reflected light in which the polarization plane is rotated by the image sensor 35, and the magnetic domain structure of the grain-oriented electrical steel sheet becomes clear.

The signal processing unit 37 includes an amplifier, an AD converter, a Digital Signal Processor (DSP), and the like. The analog signal output from the image sensor 35 is amplified by an amplifier and converted into a digital signal by an AD converter. The DSP performs predetermined digital processing on the digital signal to generate an image signal. The image signal generated by the signal processing unit 37 is output to the analysis device 40 (see FIG. 4) via a cable or by wireless communication.

Figure 4:
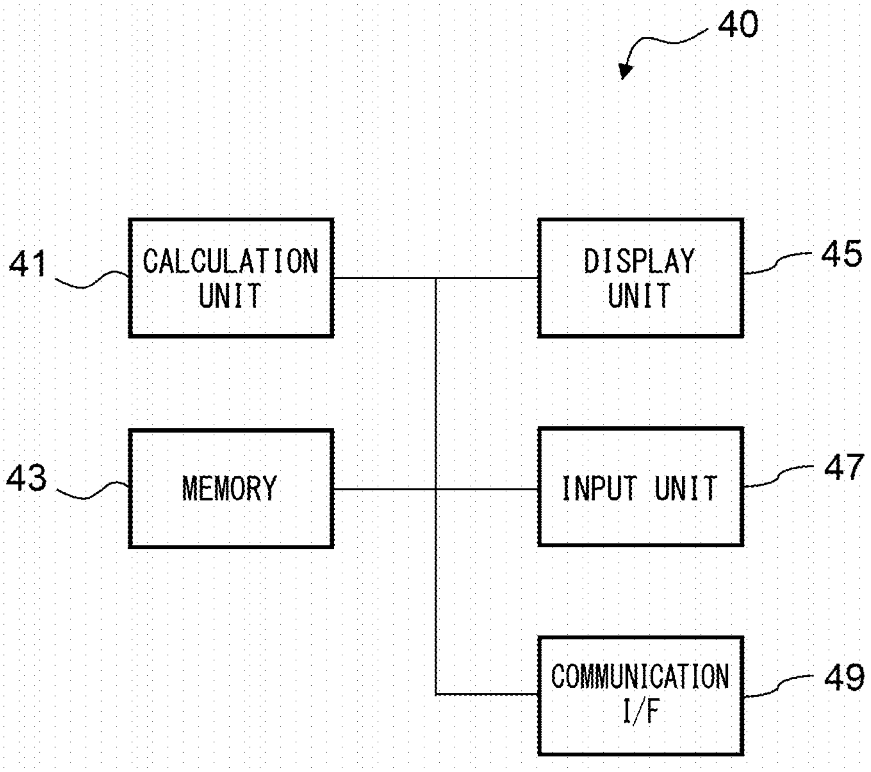
FIG. 4 is a block diagram illustrating the hardware constitution of the analysis device according to the present embodiment.

FIG. 4 illustrates a hardware constitution of the analysis device 40 that analyzes the magnetic domain structure of the grain-oriented electrical steel sheet. The analysis device 40 is a computer device such as a personal computer (PC), and includes a calculation unit 41, a memory 43, a display unit 45, an input unit 47, and a communication I/F 49.

The calculation unit 41 includes a Central Processing Unit (CPU), analyzes a magnetic domain structure from a magnetic domain image of the grain-oriented electrical steel sheet according to a program stored in the memory 43, and determines a point in which groove is formed. The processing executed by the calculation unit 41 is described in detail later.

The memory 43 includes a Read Only Memory (ROM) and a Random Access Memory (RAM). The ROM stores programs executed by the CPU of the calculation unit 41 and data required at the time of executing these programs. The program and data stored in the ROM are loaded into the RAM and executed.

Note that the memory 43 may include a magnetic memory such as a hard disk drive (HDD) or an optical memory such as an optical disk. Alternatively, the program or data may be stored in a computer-readable recording medium detachable from the analysis device 40. Alternatively, the program executed by the calculation unit 41 may be received from the network via the communication I/F 49.

The display unit 45 includes a display such as a liquid crystal display (LCD), a plasma display, or an organic electroluminescence (EL) display, displays an image on the basis of an image signal output from the image acquisition device 30, and displays an analysis result of the magnetic domain structure by the calculation unit 41.

The input unit 47 includes an input device such as a mouse or a keyboard. The communication I/F 49 is an interface for transmitting and receiving data to and from an external device via a network such as a Local Area Network (LAN), a Wide Area Network (WAN), or the Internet.

Instead of general-purpose hardware such as a CPU, dedicated hardware specialized for analyzing a magnetic domain structure, such as an application specific integrated circuit (ASIC) or a Field Programmable Gate Array (FPGA), may be adopted as the calculation unit 41.

Note that FIGS. 3 and 4 illustrate a case where the image acquisition device 30 and the analysis device 40 are separate devices, but a system in which the image acquisition device 30 and the analysis device 40 are integrated may be adopted.

Known means such as laser irradiation, electron beam irradiation, and machine processing can be adopted as means for forming the groove in the surface of the grain-oriented electrical steel sheet. Hereinafter, the constitution of a laser irradiation device that forms the groove by laser irradiation is described.

Figure 5:
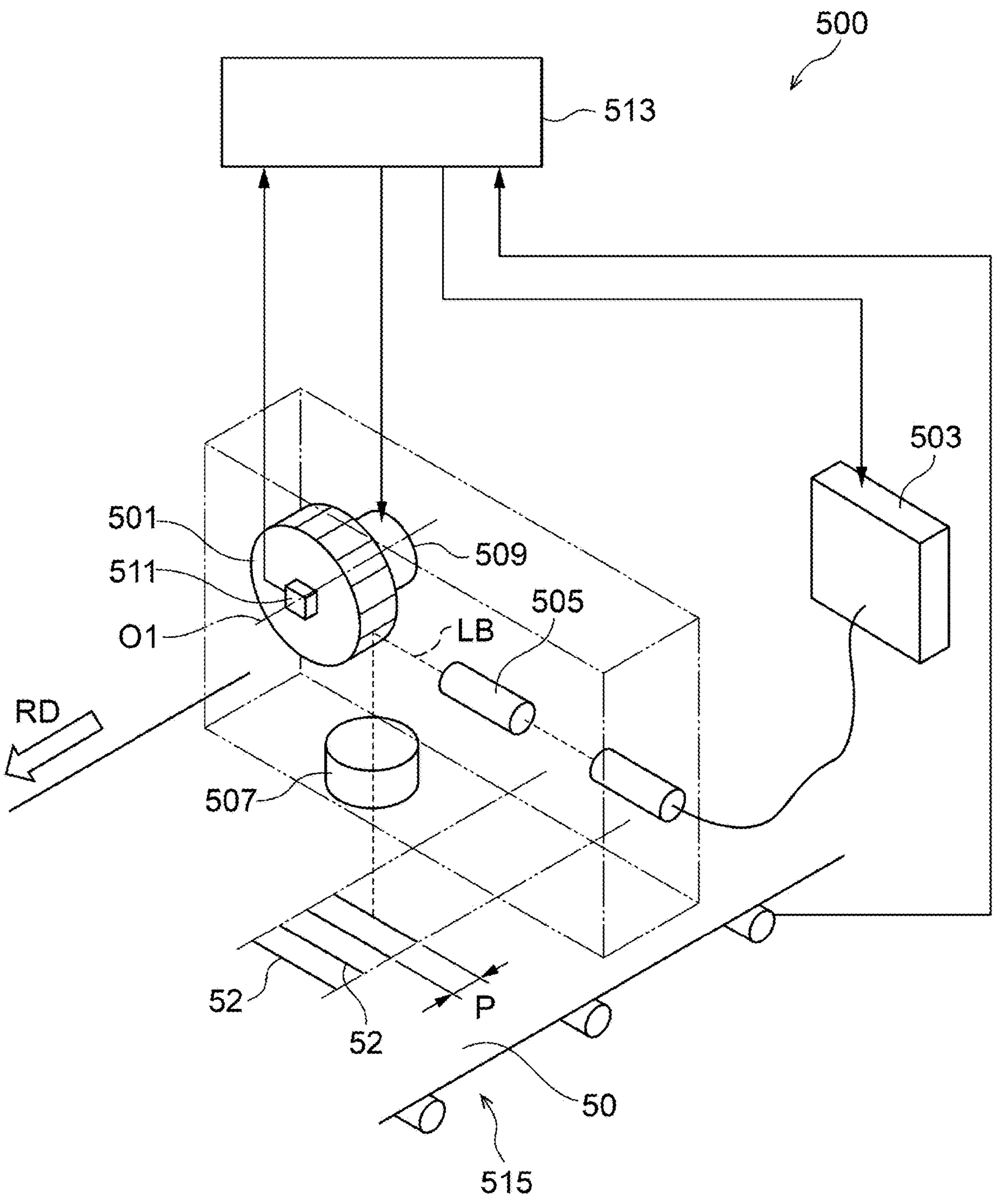
FIG. 5 is a schematic view illustrating the constitution of a laser irradiation device according to the present embodiment.

FIG. 5 illustrates a constitution of the laser irradiation device 500. The laser irradiation device 500 includes a polygon mirror 501, a light source device 503, a collimator 505, a condensing lens 507, a motor 509, a sensor 511, a control unit 513, and a sheet passing device 515.

The sheet passing device 515 passes the grain-oriented electrical steel sheet 50 in the rolling direction (RD).

The polygon mirror 501 has, for example, a regular polygonal prism shape, and a plurality of plane mirrors is provided on a plurality of side surfaces constituting the regular polygonal prism. The laser beam LB enters the plane mirror of the polygon mirror 501 from the light source device 503 via the collimator 505 in one direction (horizontal direction) and is reflected by the plane mirror.

The polygon mirror 501 is rotatable about the rotation axis O1 by driving from the motor 509. By sequentially changing the incident angle of the laser beam LB with respect to the plane mirror according to the rotation angle of the polygon mirror 501, the reflection direction of the laser beam LB is sequentially changed, and scanning can be performed along the magnetic domain control treatment line 52 of the grain-oriented electrical steel sheet 50. The magnetic domain control treatment line 52 forms an angle of 0° to 45° with respect to the orthogonal-to-rolling direction (TD) on the surface of the grain-oriented electrical steel sheet 50, and is a plurality of straight lines aligned in the rolling direction (RD). Preferably, the plurality of magnetic domain control treatment lines 52 extend parallel to each other. Preferably, the plurality of magnetic domain control treatment lines 52 are arranged at equal intervals. The interval P between the adjacent magnetic domain control treatment lines 52 represents an interval of groove forming.

The light source device 503 outputs the laser beam LB by a predetermined irradiation system (for example, a continuous irradiation system or a pulse irradiation system) under the control of the control unit 513.

The condensing lens 507 is provided on the optical path of the laser beam LB reflected from the polygon mirror 501, and constitutes a condensing optical system having a predetermined focal length. When the laser beam LB reflected from the polygon mirror 501 is condensed on the surface of the grain-oriented electrical steel sheet 50 via the condensing lens 507, the groove is formed along the magnetic domain control treatment line 52 on the surface of the grain-oriented electrical steel sheet 50.

The motor 509 is coupled to the polygon mirror 501, and rotationally drives the polygon mirror 501 under the control of the control unit 513.

The sensor 511 is connected to a drive shaft of the motor 509, detects a rotation angle of the polygon mirror 501 rotated by the motor 509, and outputs a signal indicating the detected rotation angle (Hereinafter, the rotation angle signal is referred to as a rotation angle signal.) to the control unit 513.

The control unit 513 includes a processor and is connected to the light source device 503, the motor 509, the sensor 511, and the sheet passing device 515. The control unit 513 receives an input of a speed signal from the sheet passing device 515, and outputs a signal instructing the motor 509 to rotationally drive the polygon mirror 501.

In addition, the control unit 513 controls on and off of the power of the laser beam LB output from the light source device 503 on the basis of a groove formation signal indicating a point in which the groove is formed in the magnetic domain control treatment line 52 and a rotation angle signal output from the sensor 511. When the laser irradiation device 500 is electrically connected to the analysis device 40, the groove formation signal is input from the analysis device 40 to the laser irradiation device 500. The groove formation signal may be input to the laser irradiation device 500 by an operator.

Figure 6:
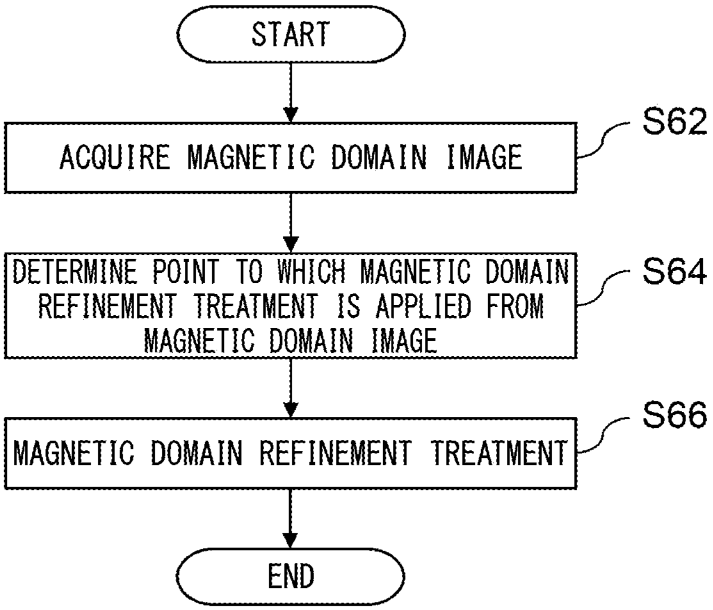
FIG. 6 is a flowchart illustrating a method for manufacturing a grain-oriented electrical steel sheet according to the present embodiment.

Next, a method for manufacturing the grain-oriented electrical steel sheet 50 according to the present embodiment is described with reference to FIG. 6.

First, the image acquisition device 30 is used to acquire a magnetic domain image of the grain-oriented electrical steel sheet 50 (step S62: image acquisition step). Next, the calculation unit 41 of the analysis device 40 derives the spatial distribution of the width (magnetic domain width) of the 180° magnetic domain from the magnetic domain image, and determines the point having the β angle corresponding to the region where the magnetic domain width is greater than or equal to a predetermined value (for example, about 500 μm or more), specifically, the point where the β angle is 1° or less, in the magnetic domain control treatment line 52 of the grain-oriented electrical steel sheet 50, as the point to which the magnetic domain refinement treatment is applied by forming the groove (step S64: determination step).

In the present embodiment, a point in which groove is formed in the magnetic domain control treatment line 52 is referred to as a “groove formation line”. Details of the processing of the step S64 executed by the calculation unit 41 is described later.

In the step S64, the point of the groove formation line may be determined by visually observing the magnetic domain image displayed on the display unit 45 by the operator, and a groove formation signal indicating the point of the groove formation line may be input to the laser irradiation device 500.

Next, the magnetic domain refinement treatment is preferentially performed by forming the groove having a predetermined depth and a predetermined width in the point determined in the step S64 among the magnetic domain control treatment line 52 of the grain-oriented electrical steel sheet 50 (step S66: groove forming step). Preferably, the magnetic domain refinement treatment is performed only on the point determined in the step S64. The step S66 may be performed by irradiation with the laser beam LB by the laser irradiation device 500, or other means such as electron beam irradiation, machine processing, and etching may be adopted.

Next, processing in the step S64 executed by the calculation unit 41 of the analysis device 40 is described.

The calculation unit 41 derives the spatial distribution of the magnetic domain width of the grain-oriented electrical steel sheet 50 using the line segment method or the Fourier transform, and determines a region where the β angle is 1° or less, which corresponds to a region having the wide magnetic domain width, among the magnetic domain control treatment line 52 of the grain-oriented electrical steel sheet 50 as a point where the groove is preferentially formed.

In the line segment method, evaluation is performed by drawing a line segment perpendicular to the magnetic domain. The interval between the line segments is set to 3 lines per 1 cm in a direction parallel to the magnetic domain, and the magnetic domain width is derived from the interval between intersection points of the 180° magnetic wall and the line segment.

The Fourier transform is particularly effective as a means for analyzing a magnetic domain structure of a magnetic body having a periodic magnetic domain structure such as a grain-oriented electrical steel sheet. Hereinafter, a method for deriving a spatial distribution of the magnetic domain width of a grain-oriented electrical steel sheet is described using a short-term two-dimensional Fourier transform (Hereinafter, it is referred to as “ST2DFT”.) obtained by expanding a short-term Fourier transform, which is one of signal processing methods that have been used for time-frequency analysis of audio signals for a long time, to a two-dimensional region.

An image (magnetic domain image) represented by an image signal acquired by the image acquisition device 30 is expressed as x (k, l) as a data column of two-dimensional coordinates (k-l coordinates). In the present embodiment, the magnetic domain image to be analyzed is an image binarized by two types of colors such as gray scale, or an image expressed by three or more gradations (multiple gradations).

In order to derive the spatial distribution of the magnetic domain width of the grain-oriented electrical steel sheet 50, the calculation unit 41 executes the following steps (A-1), (A-2), and (A-3).

(A-1) Step of cutting out a plurality of partial regions from magnetic domain image;

(A-2) Step of performing ST2DFT;

(A-3) Step of deriving spatial distribution of magnetic domain width.

Hereinafter, each step is described in detail.

(A-1) Step of Cutting Out a Plurality of Partial Regions from Magnetic Domain Image In order to cut out a plurality of partial regions from a magnetic domain image and analyze each frequency structure, a window function Wa (k, l) of a rectangular window in which a range in the k direction is $0 \le k \le N_k-1$ and a range in the l direction is $0 \le l \le N_l-1$ is used ($N_k$ and $N_l$ are natural numbers). As the window function Wa (k, l), a Hamming window, a Hanning window, a Blackman window, or the like can be applied.

When the observation position in the data column x (k, l) of the magnetic domain image is expressed by an index (n, m), and the shift amounts of the window function Wa (k, l) in the k direction and the l direction are expressed as $S_k$ and $S_l$, respectively (n, m, $S_k$, and $S_l$ are integers), a data column $x_{nm}$ ($k-nS_k$, $l-mS_l$) of a partial region obtained by cutting out a range of $nS_k \le k \le nS_k+N_k-1$ and $mS_l \le l \le mS_l+N_l-1$ from the magnetic domain image is obtained as in Expression (1).

(Mathematical Formula 1)

$$x_{nm}(k-nS_k,\ l-mS_l) = W_a(k-nS_k,\ l-mS_l)x(k,\ l) \qquad (1)$$

Figure 7:
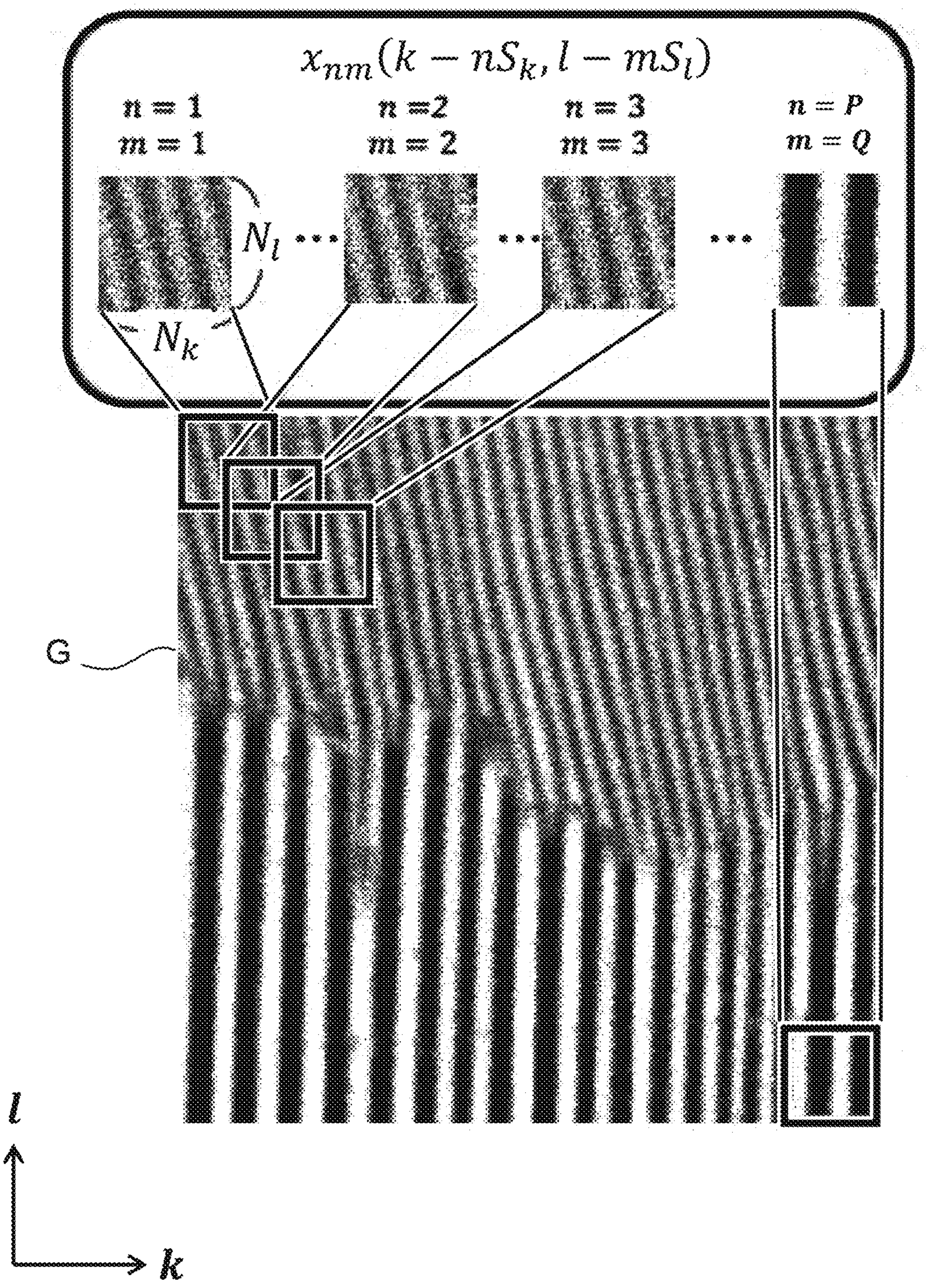
FIG. 7 is a schematic view showing a method of cutting out a plurality of partial regions from a magnetic domain image of a grain-oriented electrical steel sheet.

FIG. 7 illustrates an example in which partial regions respectively corresponding to the observation positions (n, m)=(1, 1), (2, 2), (3, 3), . . . , and (P, Q) (P and Q are natural numbers) are cut out from the magnetic domain image G.

In the present embodiment, $N_k$ and $N_l$ that define the range of the window function Wa (k, l) are parameters corresponding to the number of pixels in the k direction and the number of pixels in the l direction in the partial region, respectively.

(A-2) Step of Performing ST2DFT

When the data column of the partial region is defined as $x_{nm}$ (n', m')=$x_{nm}$ ($k-nS_k$, $l-mS_l$), and the two-dimensional Fourier transform is performed on $x_{nm}$ (n', m'), a partial Fourier image X ($f_k$, $f_l$, n, m) corresponding to the partial region of the observation position (n, m) is obtained as in Expression (2).

(Mathematical Formula 2)

$$x(f_k,\ f_l,\ n,\ m) = \sum_{n=0}^{N_k-1}\sum_{m'=0}^{N_l-1} x_{nm}(n',\ m')\exp\left\{-2\pi j\left(\frac{f_k n'}{N_k} + \frac{f_l m'}{N_l}\right)\right\} \qquad (2)$$

Here, $f_k$ and $f_l$ are space frequencies.

When the resolution of the space frequency $f_k$ is denoted by $\Delta f_k$ and the resolution of the space frequency $f_l$ is denoted by $\Delta f_l$, $\Delta f_k$ and $\Delta f_l$ are defined as in Expression (3).

(Mathematical Formula 3)

$$\begin{cases} \Delta f_k = \dfrac{2}{N_k \Delta k} \\ \Delta f_l = \dfrac{2}{N_l \Delta l} \end{cases} \qquad (3)$$

Δk and Δl are the space resolution in the k direction and the space resolution in the l direction in the magnetic domain image, respectively.

Figure 8:
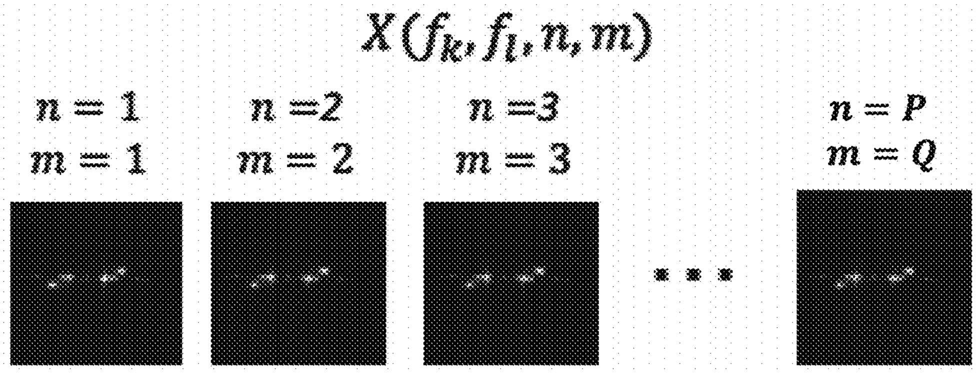
FIG. 8 is an example of a plurality of partial Fourier images obtained by applying two-dimensional Fourier transform to each of a plurality of partial regions cut out from a magnetic domain image of a grain-oriented electrical steel sheet.

For example, when the two-dimensional Fourier transform is performed on the data column $x_{nm}$ ($k-nS_k$, $l-mS_l$) of each partial region illustrated in FIG. 7, a partial Fourier image X ($f_k$, $f_l$, n, m) is obtained for each observation position (n, m) as illustrated in FIG. 8.

(A-3) Step of Deriving Spatial Distribution of Magnetic Domain Width

When the partial Fourier image X ($f_k$, $f_l$, n, m) is obtained, the coordinates (k component $$f_k^{max}(n,\ m)$$

and l component $$f_l^{max}(n,\ m)$$

) of the peak position of the spot of the partial Fourier image X ($f_k$, $f_l$, n, m) are obtained. Note that, regarding the derivation of the peak position, a region in the vicinity of k=0 and l=0 is a part that greatly depends on the contrast of the image, and thus is excluded.

Then, the spatial distribution L (n, m) of the magnetic domain width is derived as in Expression (4) from the resolution of the space frequency defined by Expression (3) and the peak position of the spot of the partial Fourier image.

(Mathematical Formula 4)

$$L(n,\ m) = \frac{1}{\sqrt{(\Delta f_k f_k^{max}(n,\ m))^2 + (\Delta f_l f_l^{max}(n,\ m))^2}} \qquad (4)$$

As described above, by using ST2DFT, it is possible to quantitatively derive the spatial distribution L (n, m) of the magnetic domain width while maintaining the position information of the magnetic domain image. FIGS. 1A to 1C described above illustrate the analysis result of the magnetic domain width derived by ST2DFT.

When deriving the spatial distribution L (n, m) of the magnetic domain width, as shown in FIG. 9, the calculation unit 41 determines, as the groove formation line 90 (solid line in FIG. 9) for forming the groove, a point having a β angle corresponding to a region where the magnetic domain width is a predetermined value or more (for example, about 500 μm or more), specifically, a point where the β angle is 1° or less in the magnetic domain control treatment line 52 (broken line in FIG. 9) of the grain-oriented electrical steel sheet 50. The control unit 513 of the laser irradiation device 500 performs control to turn on the power of the laser beam LB with respect to the groove formation line 90 in the magnetic domain control treatment line 52, and preferably to turn off the power of the laser beam LB with respect to other points. As a result, the groove is formed along the groove formation line 90.

Next, the grain-oriented electrical steel sheet 50 according to the present embodiment is described. In the grain-oriented electrical steel sheet 50 according to the present embodiment, as illustrated in FIG. 9, on a surface of the grain-oriented electrical steel sheet 50, the groove existence rate which is the rate of a part where a groove having a depth of 5 μm to 50 μm and a width of 10 μm to 300 μm exists among a total extension of magnetic domain control treatment lines 52 which forms an angle of 0° to 45° with respect to an orthogonal-to-rolling direction (TD) and are arranged in a rolling direction (RD) is 50% or more in a first region which is a region where a β angle which is a deviation angle of a grain from a Goss orientation around an axis in the orthogonal-to-rolling direction (TD) is 1° or less, and the groove existence rate is less than 50% in a second region where the β angle is more than 2°.

(Groove Formation Line 90 (Portion where Groove Having Depth of 5 μm to 50 μm and Width of 10 μm to 300 μm Exists)

As illustrated in FIG. 9, the grain-oriented electrical steel sheet 50 according to the present embodiment has a part where a groove having depth of 5 μm to 50 μm and width of 10 μm to 300 μm exists. The part where a groove having a depth of 5 μm to 50 μm and a width of 10 μm to 300 μm exists is referred as "groove formation line 90". In order to promote magnetic domain refinement and to decrease iron loss, it is preferable that the depth of the groove is 5 μm to 50 μm and the width of the groove is 10 μm to 300 μm (see patent document 5). A groove of which the depth and/or the width are outside the above-described range is not assumed as the groove formation line 90. When the groove existence rate is calculated as described later, the groove of which the depth and/or the width are outside the above-described range is not considered.

The depth of the groove constituting the groove formation line 90 may be defined as 6 μm or more, 7 μm or more, or 10 μm or more. The depth of the groove constituting the groove formation line 90 may be defined as 48 μm or less, 45 μm or less, or 40 μm or less. The width of the groove constituting the groove formation line 90 may be defined as 20 μm or more, 30 μm or more, or 50 μm or more. The width of the groove constituting the groove formation line 90 may be defined as 280 μm or less, 250 μm or less, or 200 μm or less. The depth and the width of the groove may be uniform or may vary within the above-described range in the groove formation line 90.

In addition, in order to promote the magnetic domain refinement and to reduce the iron loss, the interval P between the adjacent grooves measured along the rolling direction (RD) is preferably 1 mm to 20 mm (see patent document 5). In the grain-oriented electrical steel sheet, the interval P between the grooves may be uniform or may vary. The interval P between the grooves in only a part of the grain-oriented electrical steel sheet may be 1 mm to 20 mm, or the interval P between the grooves in the entire region of the grain-oriented electrical steel sheet may be 1 mm to 20 mm. In addition, the average value of the intervals P between the grooves in the grain-oriented electrical steel sheet may be 1 mm to 20 mm. The interval P between the adjacent grooves or the average value of the interval P between the grooves may be 2 mm or more, 3 mm or more, or 5 mm or more. The interval P between the adjacent grooves or the average value of the interval P between the grooves may be 18 mm or less, 16 mm or less, or 15 mm or less.

Tension insulating coating may be formed on the surface of the grain-oriented electrical steel sheet. In this case, the depth of the groove, the width of the groove, and the interval between the grooves along the rolling direction are values of the groove formed in the basis steel sheet. When the grain-oriented electrical steel sheet has a tension insulating coating, the depth of the groove, the width of the groove, and the interval between the grooves along the rolling direction are measured after removing the tension insulating coating.

(Magnetic Domain Control Treatment Line 52)

As illustrated in FIG. 9, the groove formation line 90 is disposed on the magnetic domain control treatment line 52. The magnetic domain control treatment lines 52 form an angle of 0° to 45° with respect to the orthogonal-to-rolling direction (TD) on the surface of the grain-oriented electrical steel sheet 50, and are arranged along the rolling direction (RD). The magnetic domain control treatment lines 52 are preferably arranged in parallel to each other. When the groove is formed by laser, the magnetic domain control treatment line 52 corresponds to the locus of the focal point of the laser beam LB in the manufacture stage of the grain-oriented electrical steel sheet 50. The magnetic domain control treatment line 52 does not exist as an entity in the grain-oriented electrical steel sheet 50, but is an imaginary line along the groove formation line 90. The magnetic domain control treatment line 52 can be specified by drawing a line along the groove formation line 90. The angle formed by the orthogonal-to-rolling direction (TD) and the extending direction of the stress introduction line 90 is the same as the angle formed by the orthogonal-to-rolling direction (TD) and the extending direction of the magnetic domain control treatment line 52 provided with the stress introduction line 90.

In the grain-oriented electrical steel sheet 50, the angle formed by the magnetic domain control treatment line 52 and the orthogonal-to-rolling direction (TD) may be uniform or may vary. The angle formed by the magnetic domain control treatment line 52 and the orthogonal-to-rolling direction (TD) may be set to 0° to 45° in only a part of the grain-oriented electrical steel sheet 50, or the angle formed by the magnetic domain control treatment line 52 and the orthogonal-to-rolling direction (TD) may be set to 0° to 45° in all the regions of the grain-oriented electrical steel sheet 50. In addition, the average value of the angles formed by the magnetic domain control treatment line 52 and the orthogonal-to-rolling direction (TD) in the grain-oriented electrical steel sheet 50 may be set to 0° to 45°. The angle formed by the magnetic domain control treatment line 52 and the orthogonal-to-rolling direction (TD) or the average value thereof may be 1° or more, 3° or more, or 5° or more. The angle formed by the magnetic domain control treatment line 52 and the orthogonal-to-rolling direction (TD) or the average value thereof may be 40° or less, 35° or less, or 30° or less.

In the present embodiment, the groove formation line 90 may exist on the magnetic domain control treatment line 52 in a non-single period. That the groove formation line 90 exists in a non-single period means that the case does not correspond to "the case where there are 10 or more groove formation lines 90 on average per 1 cm, and the standard deviation of the lengths of the non-groove formation lines between the groove formation lines 90 is 20 μm or less". That is, in the present embodiment, the groove formation line 90 obtained by performing the magnetic domain control by the normal pulse laser on the entire surface of the steel sheet is considered not to "exist in a non-single period".

However, a region where the β angle is 1° or less may be selectively irradiated with a pulse laser.

As described above, by determining the point in which groove is formed according to the β angle, in the region where the β angle is around 0°, the rate of the part (groove formation line 90) where the groove exists in the magnetic domain control treatment line 52 is relatively high, and in the region where the β angle is large, the rate is relatively low. Specifically, when the rate of the groove formation line 90 in the magnetic domain control treatment line 52 (groove existence rate) is defined as the proportion of the length of the groove formation line 90 to the total extension of the length of the magnetic domain control treatment line 52, it is preferable that the groove formation line 90 exists at a rate of 50% or more in the first region that is a region where the β angle is 1° or less, and the groove formation line 90 exists at a rate of less than 50% in the second region where the β angle is more than 2°. The first region may be defined as a region where the β angle is 1.0° or less, a region where the β angle is 0.9° or less, or a region where the β angle is 0.8° or less. The second region may be defined as a region where the β angle is more than 2.0°, a region where the β angle is 2.1° or more, or a region where the β angle is 2.2° or more.

In the third region where the β angle is more than 1° and 2° or less, the groove existence rate is preferably 20% or more and 80% or less. The groove existence rate in each of the first to third regions satisfies the following relationship.

Groove existence rate in first region≥groove existence rate in third region≥groove existence rate in second region The third region may be defined as a region where the β angle is more than 1.0° and 2.0° or less, a region where the β angle is 1.1° or more and 1.9° or less, or a region where the β angle is 1.2° or more and 1.8° or less.

In the present embodiment, the above-described groove existence rate may be satisfied in a sample having a predetermined size (for example, 100 mm square or more) extracted from any position in the grain-oriented electrical steel sheet 50.

As described above, by linearly forming the groove according to the β angle of the grain-oriented electrical steel sheet 50, the magnetic domain refinement treatment is promoted, adverse effects such as an increase in hysteresis loss, deterioration of noise characteristics, and a decrease in magnetic permeability can be minimized, and the effect of magnetic domain refinement can be maximized. This makes it possible to achieve both a reduction in iron loss and a reduction in noise.

(Measurement Method)

Hereinafter, a method for measuring parameters relating to the grain-oriented electrical steel sheet 50 according to the present embodiment is described. Note that measurement of any parameter is performed on a sample of a predetermined size collected from the grain-oriented electrical steel sheet 50. For example, a rectangular sample having both sides of 100 mm (or 100 mm or more) in length can be cut out from the grain-oriented electrical steel sheet 50 and subjected to measurement. When the grain-oriented electrical steel sheet 50 is a coil, a sample may be collected from an arbitrary point of the coil. When the grain-oriented electrical steel sheet 50 is a component incorporated in an electrical product such as a transformer or a motor, a sample may be collected from any point of the component. When the size of the component is small, the length of one side of the sample may be less than 100 mm. In this case, the total value of the sample areas is set to 10,000 $mm^2$ or more. At that time, it is desirable to collect a sample by a method such as wire cutting in order to minimize the influence of mechanical strain or the like on the sample.

(Angle Formed by Magnetic Domain Control Treatment Line 52 and Orthogonal-to-Rolling Direction (TD))

The method for measuring the angle formed by the magnetic domain control treatment line 52 and the orthogonal-to-rolling direction (TD) is as follows.

First, the groove formation line 90 included in the sample is specified. The position of the groove having the depth of 5 μm to 50 μm and the width of 10 μm to 300 μm can be specified by measuring the surface of the sample with the three-dimensional measuring machine, and the groove is assumed as the groove formation line 90. When the grain-oriented electrical steel sheet 50 has the tension insulating coating, the three-dimensional measurement of the surface of the sample is performed after removing the tension insulating coating. The tension insulating coating can be removed by, for example, immersing the sample in sodium hydroxide solution, and then, immersing the sample in dilute sulfuric acid and nitric acid. The conditions such as temperature and concentration of the sodium hydroxide solution, dilute sulfuric acid solution and nitric acid solution, and immersing time are appropriately adjusted so that the base iron of the sample is not excessively dissolved. Example of the conditions for removing operation of the tension insulating coating is as follows. At first, the sample is immersed in the sodium hydroxide solution, which is 80° C. and of which the concentration is 20%, by 15 minutes. Then, the sample is dried. And then, the sample is immersed in the dilute sulfuric acid, which is 80° C. and of which the concentration is 10%, by 4 minutes. Thereafter, sludge adhering on the surface of the sample is removed by rag, etc. Furthermore, the sample is immersed in the nitric acid, which is room temperature and of which the concentration is 10%, by about 10 seconds while agitating.

Next, the orthogonal-to-rolling direction (TD) is specified.

(1) When the sample is cut out from the coiled grain-oriented electrical steel sheet 50, the width direction of the grain-oriented electrical steel sheet 50 can be regarded as the orthogonal-to-rolling direction (TD).

(2) When the sample is cut out from a part or the like of an electrical product, the orthogonal-to-rolling direction (TD) is specified from a rolling defect on the surface of the grain-oriented electrical steel sheet 50. An extending direction of a rolling defect is regarded as a rolling direction (RD), and a direction perpendicular to the rolling direction (RD) and parallel to the sheet surface is regarded as an orthogonal-to-rolling direction (TD).

(3) When it is difficult to specify the orthogonal-to-rolling direction (TD) from a rolling defect on the surface of the grain-oriented electrical steel sheet 50, the orthogonal-to-rolling direction (TD) is specified from the crystal orientation of the grain-oriented electrical steel sheet 50. Specifically, the crystal orientation of the grain-oriented electrical steel sheet 50 to be evaluated is measured at a plurality of points. Then, a direction in which the deviation angle from the GOSS orientation at the measurement point is minimized is regarded as a rolling direction (RD), and a direction perpendicular to the rolling direction (RD) and parallel to the surface of the grain-oriented electrical steel sheet 50 is regarded as an orthogonal-to-rolling direction (TD).

In any case, from the viewpoint of convenience of measurement, it is preferable to cut out the sample from the grain-oriented electrical steel sheet 50 such that one side of the sample coincides with the orthogonal-to-rolling direction (TD).

The magnetic domain control treatment line 52 does not exist as an entity in the grain-oriented electrical steel sheet 50, but is an imaginary line along the groove formation line 90. Therefore, the narrow angle formed by the groove formation line 90 specified by the above-described procedure and the orthogonal-to-rolling direction (TD) can be regarded as the angle formed by the magnetic domain control treatment line 52 and the orthogonal-to-rolling direction (TD).

(Method for Measuring β Angle)

The β angle in the grain-oriented electrical steel sheet 50 is measured by a side reflection Laue method. The side reflection Laue method is widely known as a method for measuring a crystal orientation.

(Method for Specifying First Region, Second Region, and Third Region)

Figure 10:
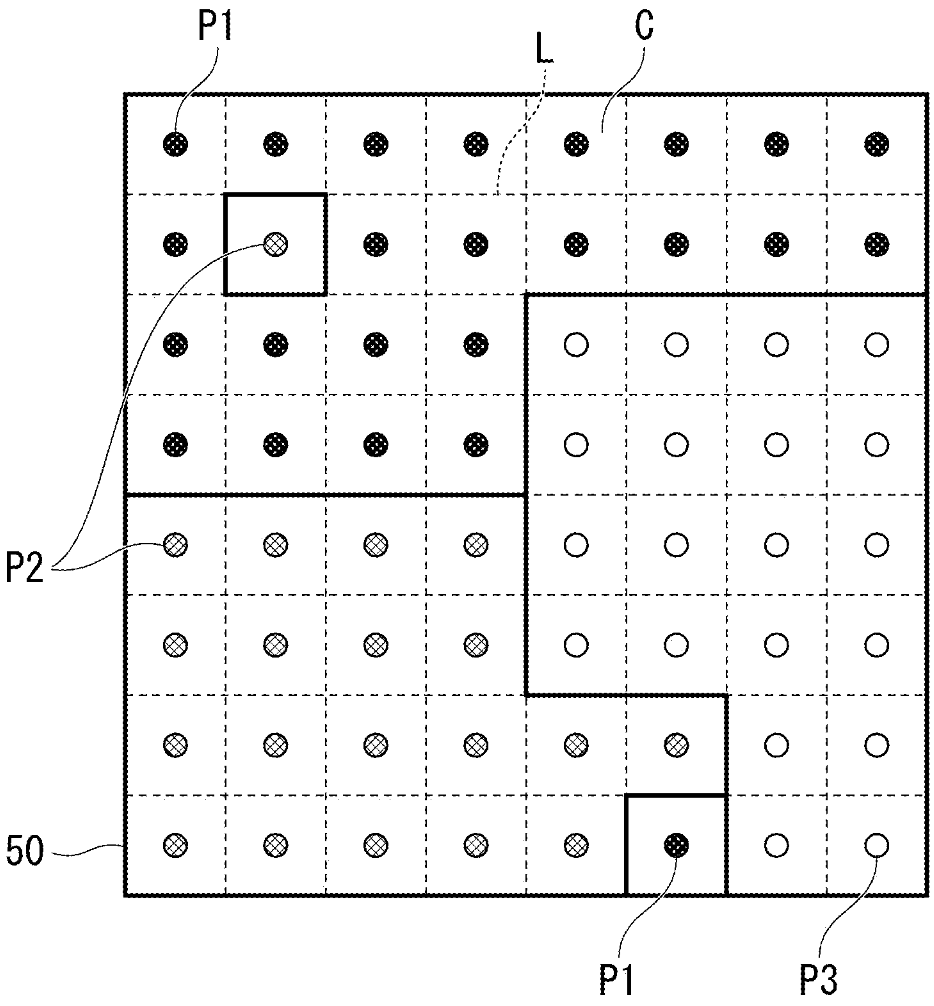
FIG. 10 is a schematic view showing a method of specifying a first region, a second region, and a third region.

A method of specifying the first region, the second region, and the third region is as follows. As illustrated in FIG. 10, first, a virtual lattice Lis set on the surface of the sample. As a result, the surface of the sample is divided into a plurality of cells C divided by the lattice L. The shape of the cell C is, for example, a square having a side of 2 mm. Then, the center of each of the cells C is used as a measurement point, and the crystal orientation is measured by a real side reflection Laue method. As a result, the β angle of the measurement point is specified, and it is determined whether the measurement point belongs to the first region A1, the second region A2, or the third region A3. Then, the cell C whose center is determined to be the first region A1 is regarded as the first region A1 over the entire cell C. Similarly, a cell C whose center is determined to be the second region A2 is regarded as the second region A2 over the entire cell C, and a cell C whose center is determined to be the third region A3 is regarded as the third region A3 over the entire cell C. In FIG. 10, the measurement point regarded as the first region A1 is indicated by a black circle P1, the measurement point regarded as the second region A2 is indicated by a gray circle P2, and the measurement point regarded as the third region A3 is indicated by a black circle P3. According to the above procedure, as illustrated in FIGS. 10 and 11, the first region A1, the second region A2, and the third region A3 on the surface of the grain-oriented electrical steel sheet 50 can be specified.

(Method for Calculating Groove Existence Rate in First Region, Second Region, and Third Region)

Figure 11:
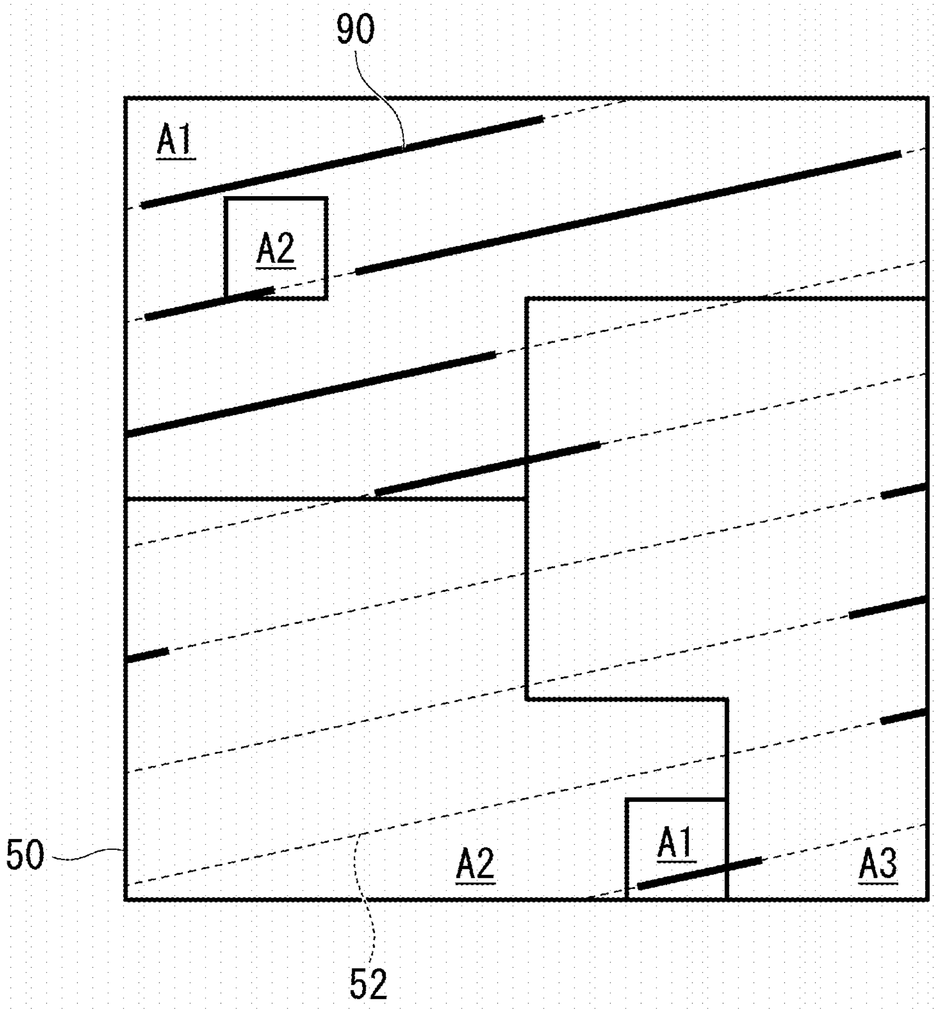
FIG. 11 is a schematic view showing a method of measuring the groove existence rate in each of a first region, a second region, and a third region.

As illustrated in FIG. 11, the magnetic domain control treatment line 52 and the groove formation line 90 in each of the first region A1, the second region A2, and the third region A3 are specified by the procedure illustrated in the description of the method for measuring the angle formed by the magnetic domain control treatment line 52 and the orthogonal-to-rolling direction (TD). A value obtained by dividing the total length of all the groove formation lines 90 included in all the first regions A1 of the sample by all the magnetic domain control treatment lines 52 included in all the first regions A1 of the sample is the groove existence rate in the first region A1. Similarly, the value obtained by dividing the total length of all the groove formation lines 90 included in all the second regions A2 of the sample by all the magnetic domain control treatment lines 52 included in all the second regions A2 of the sample is the groove existence rate in the second region A2, and the value obtained by dividing the total length of all the groove formation lines 90 included in all the third regions A3 of the sample by all the magnetic domain control treatment lines 52 included in all the third regions A3 of the sample is the groove existence rate in the third region A3.

The method for measuring the interval of the groove formation line 90 along the rolling direction (RD) is as follows. First, the rolling direction (RD) and the groove formation line 90 are specified by the procedure described in the description of the method for measuring the angle formed by the magnetic domain control treatment line and the orthogonal-to-rolling direction (TD). Next, the interval between the groove formation lines 90 along the rolling direction (RD) may be measured.

A method of determining whether the groove formation line 90 exists in a non-single period is as follows. First, the magnetic domain control treatment line 52 and the groove formation line 90 included in the sample are specified by the above-described procedure. As described above, it is assumed that the groove formation line 90 exists in a non-single period in the "the case where there are 10 or more groove formation lines 90 on average per 1 cm, and the standard deviation of the lengths of the non-magnetic domain refinement treatment lines between the groove formation lines 90 is more than 20 μm". Therefore, in the determination, it is determined whether each of the plurality of magnetic domain control treatment lines 52 included in the sample (for example, a rectangular sample with a length of 100 mm on both sides) includes 10 or more groove formation lines 90 on average per 1 cm. For example, when the length of one magnetic domain control treatment line 52 included in the sample is X cm and the number of groove formation lines 90 included in the magnetic domain control treatment line 52 is y, it is determined that there are y/X groove formation lines 90 on average per 1 cm in the magnetic domain control treatment line 52. Further, in each of the magnetic domain control treatment lines 52 determined to include 10 or more groove formation lines 90 on average per 1 cm, it is determined whether the standard deviation of the length of the non-magnetic domain refinement treatment line is 20 μm or less. When the groove formation line 90 is provided in a non-single period in 50% or more of all the magnetic domain control treatment lines 52 included in the sample, it is determined that the groove formation line 90 exists in the non-single period in the sample.

EXAMPLES

The effect of one aspect of the present invention is described more specifically with reference to examples. However, the conditions in the examples are merely one condition example adopted to confirm the operability and effects of the present invention. The present invention is not limited to this one condition example. The present invention can adopt various conditions as long as the object of the present invention is achieved without departing from the gist of the present invention.

The magnetic domain refinement treatment was performed under various conditions shown in Table 1 on the grain-oriented electrical steel sheets of the same lot which are classified as 23P085 in Table 2 of JIS C 2553:2019 "Grain-oriented electrical steel strip" and which have 0.23 mm of thickness. The noise and iron loss of the grain-oriented electrical steel sheets subjected to the magnetic domain refinement treatment obtained as a result are evaluated and described in Tables 2 and 3. In Table 2, inappropriate values were underlined.

The methods for evaluating noise and iron loss were as follows. First, 180 grain-oriented electrical steel sheets having a sheet thickness of 0.23 mm were laminated to form a three-phase transformer core. The widths of the foot and the yoke of the three-phase transformer core were both 150 mm. The height and width of the outer shape of the three-phase transformer core were both 750 mm. Noise and iron loss of these three-phase transformer cores were measured. The measurement conditions were a frequency of 50 Hz and an excitation magnetic flux density of 1.5 T.

In measuring the noise, microphones were arranged at equal intervals at eight points around the transformer in which the three-phase transformer core was incorporated. The distance between the transformer and the microphone was 30 cm. The values obtained by correcting the A characteristics to the noise measurement results by the microphones and averaging the results are described in Table 3 as the noise evaluation results (unit: dBA) of the grain-oriented electrical steel sheets. An example in which the evaluation result of noise was 25.00 dBA or less was determined to be an example in which noise reduction was achieved. The noise evaluation result determined to be unacceptable was underlined.

The iron loss was obtained by measuring voltages and currents on the primary side and the secondary side with a power analyzer when excitation was performed at a frequency of 50 Hz and an excitation magnetic flux density of 1.5 T as described above. The obtained iron loss is described in Table 3 as an iron loss evaluation result (unit: W/kg) of the grain-oriented electrical steel sheet. An example in which the evaluation result of the iron loss was 0.70 W/kg or less was determined to be an example in which iron loss reduction was achieved. The noise evaluation result determined to be unacceptable was underlined.

Further, in the grain-oriented electrical steel sheet subjected to the magnetic domain refinement treatment, the angle formed by the groove and the orthogonal-to-rolling direction, the depth of the groove, the width of the groove, the interval between the grooves, and the groove existence rate in the first region, the second region, or the third region were measured, and are described in Table 2. In all examples, the groove was formed so that the angle formed by the groove and the orthogonal-to-rolling direction, the depth of the groove, the width of the groove, and the interval between the grooves are constant value. The measurement method was in principle according to the procedure described above. A rectangular sample having both sides of 100 mm in length was cut out from a three-phase transformer core for measuring noise and iron loss, and subjected to measurement.

In accordance with the above-described measuring method, in the examples in which the shape of the groove is inappropriate (i.e. the example in which the depth of the groove or the width of the groove are insufficient or excessive), the groove existence rate is 0%. However, for the purpose of reference, the groove existence ratio when the groove having inappropriate form was assumed as the groove formation line is described in Table 2.

TABLE 1

| | Angle formed by magnetic domain control treatment line and orthogonal-to-rolling direction TD (°) | Depth of groove (μm) | Width of groove (μm) | Average interval between grooves (mm) |
|---|---|---|---|---|
| 1 | None | | | |
| 2 | 50 | 23 | 152 | 8 |
| 3 | 15 | 4 | 155 | 8 |
| 4 | 15 | 53 | 162 | 8 |
| 5 | 15 | 8 | 9 | 8 |
| 6 | 15 | 28 | 302 | 8 |
| 7 | 15 | 24 | 145 | 0.8 |
| 8 | 15 | 27 | 132 | 21 |
| 9 | 15 | 26 | 136 | 8 |
| 10 | 15 | 29 | 170 | 8 |
| 11 | 15 | 22 | 161 | 8 |
| 12 | 15 | 28 | 162 | 8 |
| 13 | 15 | 21 | 188 | 8 |
| 14 | 0 | 30 | 169 | 8 |
| 15 | 15 | 31 | 160 | 8 |
| 16 | 30 | 25 | 181 | 8 |
| 17 | 45 | 20 | 142 | 8 |
| 18 | 15 | 6 | 149 | 8 |
| 19 | 15 | 48 | 142 | 8 |
| 20 | 15 | 14 | 12 | 8 |
| 21 | 15 | 24 | 65 | 8 |
| 22 | 15 | 31 | 296 | 8 |
| 23 | 15 | 21 | 158 | 1 |
| 24 | 15 | 24 | 137 | 10 |
| 25 | 15 | 20 | 129 | 20 |
| 26 | 15 | 27 | 186 | 8 |
| 27 | 15 | 29 | 125 | 8 |
| 28 | 15 | 25 | 149 | 8 |
| 29 | 15 | 21 | 151 | 8 |

TABLE 2

| | Groove existence ratio in first region (%) | Groove existence ratio in second region (%) | Groove existence ratio in third region (%) | First region ≥ Third region ≥ Second region |
|---|---|---|---|---|
| 1 | 0 | 0 | 0 | |
| 2 | 62 | 34 | 55 | Satisfied |
| 3 | 77 | 25 | 54 | Satisfied |
| 4 | 80 | 33 | 48 | Satisfied |
| 5 | 66 | 28 | 58 | Satisfied |
| 6 | 74 | 36 | 48 | Satisfied |
| 7 | 68 | 25 | 53 | Satisfied |
| 8 | 76 | 38 | 61 | Satisfied |
| 9 | 49 | 34 | 45 | Satisfied |
| 10 | 72 | 51 | 58 | Satisfied |
| 11 | 62 | 38 | 19 | Not Satisfied |
| 12 | 84 | 48 | 81 | Satisfied |
| 13 | 75 | 32 | 26 | Not Satisfied |
| 14 | 81 | 29 | 50 | Satisfied |
| 15 | 73 | 15 | 59 | Satisfied |
| 16 | 68 | 33 | 54 | Satisfied |
| 17 | 75 | 34 | 41 | Satisfied |
| 18 | 63 | 33 | 50 | Satisfied |
| 19 | 77 | 41 | 58 | Satisfied |
| 20 | 76 | 39 | 45 | Satisfied |
| 21 | 77 | 47 | 55 | Satisfied |
| 22 | 59 | 28 | 57 | Satisfied |
| 23 | 61 | 43 | 60 | Satisfied |
| 24 | 54 | 44 | 46 | Satisfied |
| 25 | 74 | 26 | 53 | Satisfied |
| 26 | 51 | 21 | 22 | Satisfied |
| 27 | 97 | 34 | 79 | Satisfied |
| 28 | 73 | 3 | 58 | Satisfied |
| 29 | 65 | 49 | 55 | Satisfied |

TABLE 3

| | Evaluation result of noise @1.5 T (dBA) | Evaluation result of iron loss @1.5 T (W/kg) |
|---|---|---|
| 1 | 20.15 | 0.721 |
| 2 | 27.23 | 0.741 |
| 3 | 21.34 | 0.712 |
| 4 | 26.45 | 0.713 |
| 5 | 20.39 | 0.713 |
| 6 | 26.04 | 0.740 |
| 7 | 22.55 | 0.695 |
| 8 | 23.84 | 0.698 |
| 9 | 23.37 | 0.712 |
| 10 | 26.15 | 0.649 |
| 11 | 24.21 | 0.688 |
| 12 | 24.76 | 0.662 |
| 13 | 24.35 | 0.682 |
| 14 | 19.64 | 0.621 |
| 15 | 20.56 | 0.632 |
| 16 | 22.17 | 0.644 |
| 17 | 23.74 | 0.672 |
| 18 | 20.74 | 0.671 |
| 19 | 23.11 | 0.655 |
| 20 | 20.16 | 0.674 |
| 21 | 20.13 | 0.656 |
| 22 | 23.18 | 0.675 |
| 23 | 21.42 | 0.675 |
| 24 | 21.56 | 0.630 |
| 25 | 23.14 | 0.676 |
| 26 | 22.51 | 0.676 |
| 27 | 20.06 | 0.658 |
| 28 | 19.40 | 0.675 |
| 29 | 23.71 | 0.639 |

In Example 1, the magnetic domain refinement treatment was not performed. In Example 1, since the groove formation line was not provided, deterioration of the noise evaluation result was not observed. On the other hand, in Example 1, iron loss reduction was not achieved.

Example of Inappropriate Angle

In Example 2, the angle formed by the magnetic domain control treatment line and the orthogonal-to-rolling direction was excessive. In Example 2, the noise evaluation result deteriorated, but iron loss reduction was not achieved.

Example of Inappropriate Depth of Groove

In Example 3, the depth of the groove was insufficient. In Example 3, iron loss reduction was not achieved. In Example 4, the depth of the groove was excessive. In Example 4, the noise evaluation result deteriorated, but iron loss reduction was not achieved.

Example of Inappropriate Width of Groove

In Example 5, the width of the groove was insufficient. In Example 5, iron loss reduction was not achieved. In Example 6, the width of the groove was excessive. In Example 6, the noise evaluation result deteriorated, but iron loss reduction was not achieved.

Example in which Groove Existence Rate in First Region is Inappropriate

In Example 9, the groove was uniformly formed in the magnetic domain control treatment line. In Example 9, the groove existence rate in both the first region and the second region was set to a low level. In Example 9, noise was suppressed to a low level, on the other hand, iron loss reduction was not achieved.

Example in which Groove Existence Rate in Second Region is Excessive

In Example 10, the groove was uniformly formed in the magnetic domain control treatment line. In Example 10, the groove existence rate in both the first region and the second region was set to a high level. In Example 10, iron loss reduction was achieved, but noise reduction was not achieved.

In Example 7, Example 8, and Example 11 to Example 29, the groove was preferentially formed to the point having the β angle of 1° or less. In Example 7, Example 8, and Example 11 to Example 29, the form of the groove at the groove formation line was also within an appropriate range. In Example 7, Example 8, and Example 11 to Example 29, both iron loss reduction and noise reduction were achieved. In the Example in which the relationship of the groove existence rate in the first region≥the groove existence rate in the third region≥the groove existence rate in the second region was satisfied, the iron loss and the noise were further reduced.

BRIEF DESCRIPTION OF THE REFERENCE SYMBOLS

30 Image acquisition device
31 Light source unit
33 MO sensor
35 Image sensor
37 Signal processing unit
40 Analysis device
41 Calculation unit
43 Memory
45 Display unit
47 Input unit
49 Communication I/F
50 Grain-oriented electrical steel sheet
52 Magnetic domain control treatment line
90 Groove formation line (portion where groove having depth of 5 μm to 50 μm and width of 10 μm to 300 μm exists)
500 Laser irradiation device
L Lattice
C Cell
A1 First region
A2 Second region
A3 Third region
P1 Measurement point determined as first region
P2 Measurement point determined as second region
P3 Measurement point determined as third region
RD Rolling direction
TD Orthogonal-to-rolling direction

The invention claimed is:

1. A grain-oriented electrical steel sheet, wherein on a surface of the grain-oriented electrical steel sheet, a groove existence rate which is a rate of a part where a groove having a depth of 5 μm to 50 μm and a width of 10 μm to 300 μm exists among a total extension of magnetic domain control treatment lines which forms an angle of 0° to 45° with respect to an orthogonal-to-rolling direction and are arranged in a rolling direction is 50% or more in a first region which is a region where a β angle which is a deviation angle of a grain from a Goss orientation around an axis in the orthogonal-to-rolling direction is 1° or less, and the groove existence rate is less than 50% in a second region where the β angle is more than 2°.

2. The grain-oriented electrical steel sheet according to claim 1, wherein the groove existence rate is 20% or more and 80% or less in a third region which is a region where the β angle is more than 1° and 2° or less, and the groove existence rate in the first region≥the groove existence rate in the third region≥the groove existence rate in the second region.

3. The grain-oriented electrical steel sheet according to claim 1, wherein the groove having the depth of 5 μm to 50 μm and the width of 10 μm to 300 μm exists at an interval of 1 mm to 20 mm in the rolling direction.

4. A method for manufacturing a grain-oriented electrical steel sheet, the method comprising:

acquiring a magnetic domain image of a grain-oriented electrical steel sheet;

determining, based on a spatial distribution of a magnetic domain width of the magnetic domain image and a β angle which is a deviation angle of a grain from a Goss orientation around an axis in the orthogonal-to-rolling direction, a point in which a groove having a depth of 5 μm to 50 μm and a width of 10 μm to 300 μm is formed among magnetic domain control treatment lines which forms an angle of 0° to 45° with respect to an orthogonal-to-rolling direction of the grain-oriented electrical steel sheet and are arranged in a rolling direction; and forming the groove to the point determined during the determining among the magnetic domain control treatment line.

5. The method for manufacturing a grain-oriented electrical steel sheet according to claim 4, wherein in the determining, a point having the β angle of 1° or less in the magnetic domain control treatment line is determined as a point in which the groove is formed.

6. The method for manufacturing a grain-oriented electrical steel sheet according to claim 4, wherein in the determining, a spatial distribution of the magnetic domain width is derived from the magnetic domain image by using two-dimensional Fourier transform.

7. The grain-oriented electrical steel sheet according to claim 2, wherein the groove having the depth of 5 μm to 50 μm and the width of 10 μm to 300 μm exists at an interval of 1 mm to 20 mm in the rolling direction.

8. The method for manufacturing a grain-oriented electrical steel sheet according to claim 5, wherein in the determining, a spatial distribution of the magnetic domain width is derived from the magnetic domain image by using two-dimensional Fourier transform.

* * * * *